Sept. 11, 1951  N. CHRISTENSEN  2,567,320
INDUSTRIAL PORTABLE VALVE FACER
Filed June 26, 1950  2 Sheets-Sheet 1
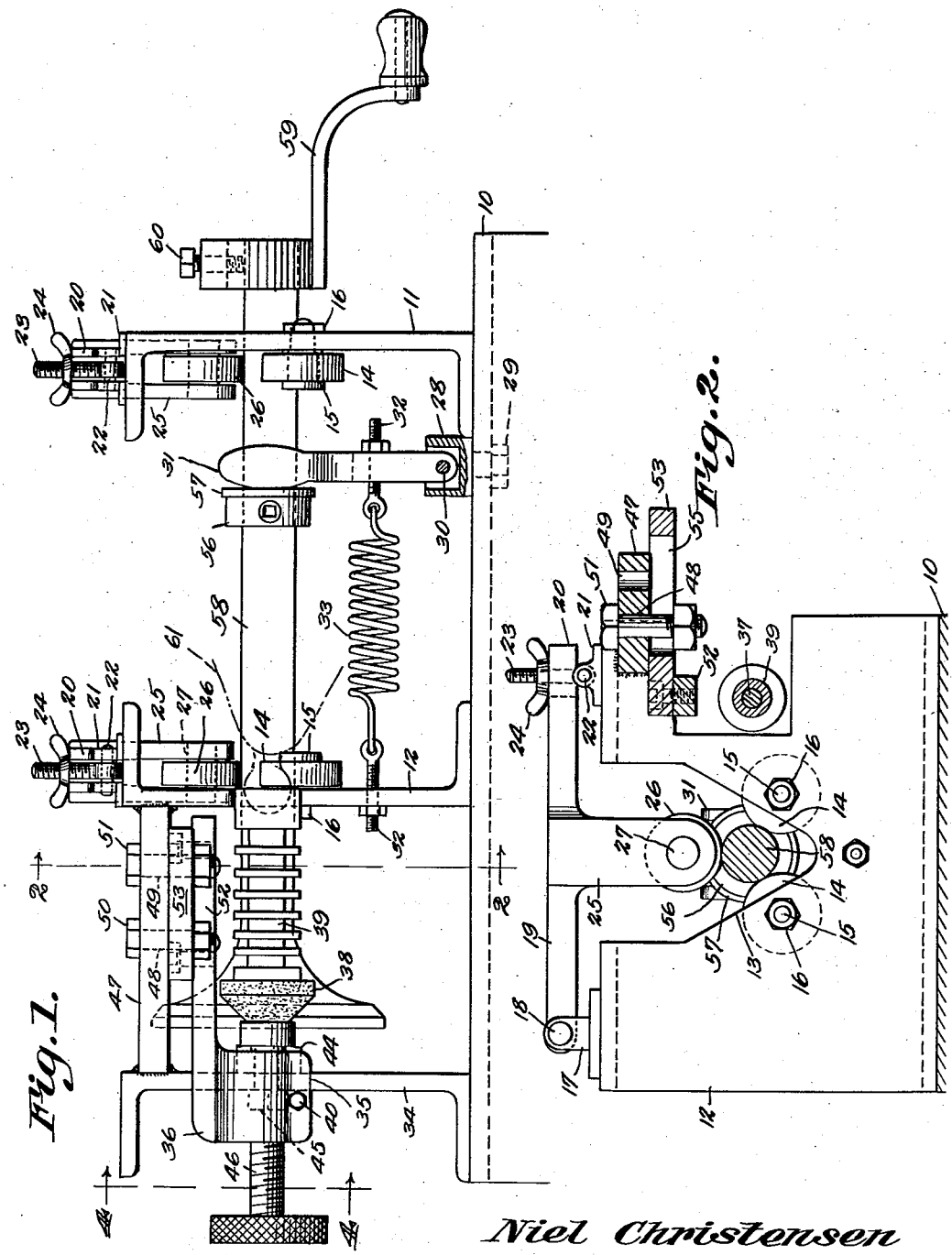
Niel Christensen
INVENTOR
BY *CA Snow & Co.*
ATTORNEYS.

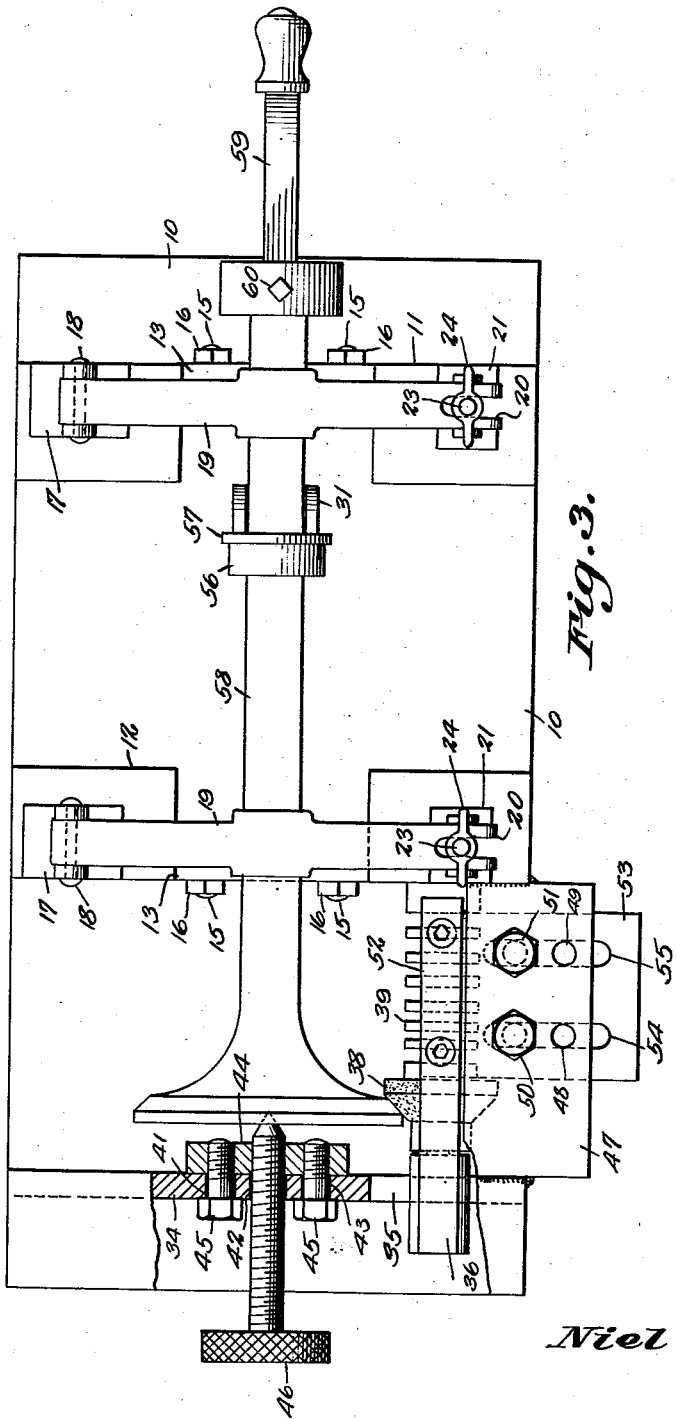
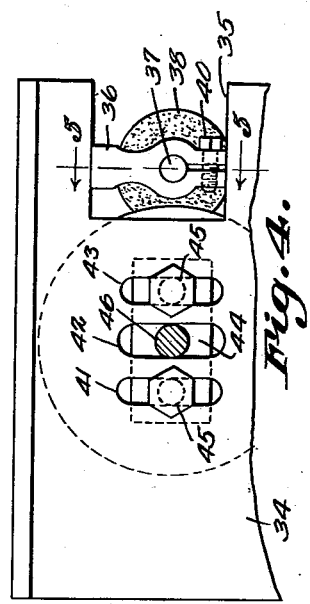

Patented Sept. 11, 1951

2,567,320

UNITED STATES PATENT OFFICE 2,567,320

INDUSTRIAL PORTABLE VALVE FACER

Niel Christensen, Shreveport, La.

Application June 26, 1950, Serial No. 170,321

3 Claims. (Cl. 51—103)

This invention relates to valve facing devices in general and more particularly to valve facing devices which are portable and adapted for industrial use as well as by average engine owners.

Heretofore various types of valve facing devices have been used but have not been found entirely satisfactory for various reasons. Prior devices have been large and unwieldy as well as costly to manufacture. In addition these prior devices have been difficult to adjust and operate and of complex construction.

An object of the present invention is to provide a valve facing device of simple construction overcoming the drawbacks of previous devices.

Another object of the present invention is to provide a portable valve facing device for use with standard types of portable electric drills.

A further object is to provide a simplified construction of a portable facing device having adjusting means which are easily and quickly operable by experienced persons.

Still another object is to provide a valve facer of the character described which has accurate securing and holding means for a valve to be faced and which are quickly and easily placed into or out of operable position.

Yet another object of the invention is to provide improved means for rotatably and angularly holding a valve for facing with a minimum of time and skill required for adjustment and operation thereof.

Further objects and advantages will appear from the following detailed description of a single preferred embodiment of the invention taken together with the drawings in which:

Figure 1 is a side elevational view of the valve facing device of the present invention.

Fig. 2 is a sectional view on the line 2—2 of Fig. 1 looking in the direction of the arrows.

Fig. 3 is a top plan view of the valve facing device with a portion broken away to clarify the valve adjusting means.

Fig. 4 is a partial elevational view on the line 4—4 of Fig. 1 looking in the direction of the arrows.

Fig. 5 is a partial sectional view on the line 5—5 of Fig. 4.

Referring to the drawings in detail, the structure comprises a base 10 having an end plate 11 vertically secured thereto. Spaced from the end plate 11 is an intermediate vertical plate 12 secured to the base 10. The plates 11 and 12 have slots 13 extending downwardly from the top edge as shown in Fig. 2. In proximity to the bottom of the slots there are arranged roller bearings 14 on each side of the slot and held in position by means of pins 15 extending through the plates and nuts 16 on the ends thereof.

Mounted on the top of each plate 11 and 12 there is a bracket 17 having a pivot pin 18 therein. An arm 19 is pivotally mounted on the pin 18 and which has a yoke 20 formed on the free end thereof. A bracket 21 is fastened on top of each plate 11 and 12 opposite from the brackets 17 and pivotally supported by means of pins 22 is a bolt 23 adapted to carry wing nuts 24 and for coaction with the yokes 20.

Each arm 19 has a central depending portion 25 rotatably mounting at the lower end thereof, ball bearings 26 by means of pins 27 for coaction with bearings 26 to constitute a support for a stem of a valve to be ground or faced, as seen in Fig. 1.

Intermediate of plate 11 and 12 is a yoke holding block 28 secured to base 10 by means of a bolt and nut generally designated by the numeral 29 and pivotally mounted thereon by means of pin 30, is a yoke 31. Eye-bolts 32 are secured in plate 12 and yoke 31, and a tension spring 33 is fastened to the eye-bolts to bias yoke 31 towards plate 12.

A plate 34 is secured to base 10 and has a cut out portion 35. Passing through portion 35 is a bracket 36 for holding a stone supporting sleeve 39 and grinding stone 38 which are mounted on the shaft 37 clamped in the bracket by a screw 40. The plate 34 has three elongated holes 41, 42 and 43 therethrough permitting adjustably mounting a plate 44 by means of bolts 45. The plate 44 has an opening therethrough which is screw threaded and adapted for adjustably holding a pointed feed adjusting bolt 46.

Fastened between plates 12 and 34 by welding or any suitable means is a plate 47 for holding the grinding attachment. Plate 47 has two transversely spaced sets of openings 48 and 49 therein. Bolts 50 and 51 are inserted through either of the sets of openings depending upon the diameter of valve to be faced. Bracket 36 has an extended arm 52 bolted to a plate 53, Fig. 2 the plate having elongated slots 54 and 55 therein for coaction with bolts 50 and 51 for adjusting the distance of the stone 38 from the axis of a valve for proper size grinding. Ordinarily openings 48 will be used and if large valves are to be faced and the slots 54, 55 in plates 53 give insufficient adjustment then the bolts 50 and 51 are placed through openings 49.

As seen in Fig. 5 the shaft 37 on which the stone supporting sleeve 39 is mounted, is held in an opening in the bracket 36 and secured therein by the screw 40. The opposite end of stone supporting sleeve 39 has means for connection with a portable electric drill 61 or the like for operation of the stone 38.

When mounting the valve in the device for facing, the wing nuts 24 are released and the arms 19 raised around pivots 18. Feed bolt 46 is turned counterclockwise until the point is flush with plate 44. A collar 56 is slid onto the stem 58 of the valve and between the collar and yoke 31 is placed a floating washer 57. The valve is placed on bearings 14 and rests thereon. A handle 59 is secured to the free end of the valve stem 58 by means of lock bolt 60. The collar 50 and washer 57 are adjusted against yoke 31. The yoke 31 and spring 33 maintain the valve firmly against the adjusting screw 46 for proper grinding. Arms 19 are placed in closed position and secured by wing nuts 24 which brings bearings 26 into contact with valve stem 58 and forms with bearings 14 a triangular rotatable support for the valve. The plate 44 can be adjusted for centering screw 46 in the center of the valve by means of bolts 45 and slots 41 and 43. Screw 46 is then turned clockwise until the valve just engages stone 38 against the action of spring 33. The motor is connected with stone sleeve 39 and after starting the motor the handle 59 is rotated slowly. Screw 46 is turned to effect the required amount of grinding or facing of the valve. As set forth before, different sizes of valves can be faced by adjusting plate 53.

Various changes can be made in the embodiment of the invention defined without departing from the scope of the invention, as defined in the appended claims.

I claim:
1. A portable valve facer comprising a base, spaced upright plates on said base having a slot downwardly extending therein, roller bearing means on each said plate spaced on either side of said slots, an arm pivotally mounted on each said plate and adapted for bridging the slots therein, a roller bearing suspended from each of said arms for coaction with said bearings on said plates and forming valve stem supporting means, a third upright plate spaced from the other of said plates, a valve feed screw adjustably mounted in said third plate, a bracket in said third plate, a grinding stone rotatably supported by said bracket, means for adjusting the distance of said stone from a valve to be faced, connection means to a source of power for actuation of said stone, and a support plate having elongated openings therethrough secured to said third plate, said screw extending therethrough, said support plate being adjustable on said third plate for varying the position of said screw for proper centering with a valve head to be faced.

2. In a portable valve facer as claimed in claim 1, an attachment plate secured between said third plate and the adjacent of said upright plates and having two transversely spaced sets of holes therethrough, said bracket having an extended arm thereon, a plate having elongated openings therein secured to said attachment plate by bolts extending through said holes and said elongated openings, said extending arm being fastened to said plate having the elongated openings, said combination comprising the means for adjusting said grinding stone.

3. In a portable valve facer as claimed in claim 2, a yoke on said base, said yoke being pivotally mounted, a collar adapted for securing on a valve stem to be faced and contacting said yoke and spring tensioning means connected to said yoke for maintaining a valve head in snug contact with said screw by coaction with said collar, and means for rotating a valve to be faced.

NIEL CHRISTENSEN.

REFERENCES CITED

The following references are of record in the file of this patent:

UNITED STATES PATENTS

| Number | Name | Date |
|---|---|---|
| 1,533,133 | Nickau | Apr. 14, 1925 |
| 1,572,165 | Smith et al. | Feb. 9, 1926 |
| 1,702,267 | Miller | Feb. 19, 1929 |